United States Patent
Delgado et al.

[11] Patent Number: 6,017,624
[45] Date of Patent: Jan. 25, 2000

[54] PRESSURE SENSITIVE ADHESIVE FILM HAVING DIFFERENTIAL ADHESIVE PROPERTIES AND METHOD OF MAKING THE SAME

[75] Inventors: Joaquin Delgado, Stillwater; Spencer F. Silver, White Bear Lake, both of Minn.

[73] Assignee: 3M Innovative Properties Company, St. Paul, Minn.

[21] Appl. No.: 08/960,938

[22] Filed: Oct. 30, 1997

Related U.S. Application Data

[63] Continuation of application No. 08/619,379, Mar. 21, 1996, abandoned.

[51] Int. Cl.[7] ............................. B32B 7/12; C08J 9/28
[52] U.S. Cl. .................. 428/355 AC; 428/402; 428/355 EN; 521/56; 521/60; 521/63; 521/64; 523/223; 524/801
[58] Field of Search .................... 428/40.1, 343, 428/402, 355 AC, 355 EN, 355 R; 521/56, 60, 63, 64; 523/223; 524/801

[56] References Cited

U.S. PATENT DOCUMENTS

| | | | |
|---|---|---|---|
| 3,691,140 | 9/1972 | Silver | 260/78.5 |
| 4,166,152 | 8/1979 | Baker et al. | 428/522 |
| 4,645,783 | 2/1987 | Kinoshita | 523/221 |
| 4,735,837 | 4/1988 | Miyasaka et al. | 428/40 |
| 5,045,569 | 9/1991 | Delgado | 521/60 |
| 5,053,436 | 10/1991 | Delgado | 521/64 |
| 5,100,728 | 3/1992 | Plamthottam et al. | 428/345 |
| 5,128,412 | 7/1992 | Miyasaka et al. | 525/108 |
| 5,212,011 | 5/1993 | Ishikawa et al. | 428/343 |
| 5,215,818 | 6/1993 | Silver et al. | 428/343 |
| 5,266,402 | 11/1993 | Delgado et al. | 428/355 |
| 5,268,228 | 12/1993 | Orr | 428/343 |
| 5,385,772 | 1/1995 | Slovinsky et al. | 428/355 X |
| 5,458,983 | 10/1995 | Wang et al. | 1505/57 |
| 5,508,313 | 4/1996 | Delgado et al. | 428/355 X |
| 5,614,310 | 3/1997 | Delgado et al. | 428/355 AC X |

FOREIGN PATENT DOCUMENTS

| | | |
|---|---|---|
| WO 93/02855 | 2/1993 | WIPO . |
| WO 93/12147 | 6/1993 | WIPO . |
| WO 94/22971 | 10/1994 | WIPO . |
| WO 96/01281 | 1/1996 | WIPO . |
| WO 96/14094 | 5/1996 | WIPO . |

OTHER PUBLICATIONS

"The Fracture Threshold for an Adhesive Interlayer", M.L. Williams, *Journal of Applied Polymer Science*, vol. 14, (1970) pp. 1121–1126.
"Tensile Testing of Bulk and Thin Film Adhesives", B.C. Duncan et al., Conference Proceedings, Sep. 3–6, 1996, pp. 331–337.
Abstract DE3417746.
Copending application Serial No. 08/565,111 filed Nov. 30, 1995.

*Primary Examiner*—Daniel Zirker

[57] ABSTRACT

Unsupported pressure sensitive adhesive (PSA) films of tacky, polymeric microspheres are provided. The opposite major surfaces of the film provide different levels of peel adhesion, allowing for removability without substrate damage. In addition, the PSA films provide high shear strength and good tensile properties.

29 Claims, 3 Drawing Sheets

PRESSURE SENSITIVE ADHESIVE FILM HAVING DIFFERENTIAL ADHESIVE PROPERTIES AND METHOD OF MAKING THE SAME

This is a continuation of application Ser. No. 08/619,379 filed Mar. 21, 1996, now abandoned.

FIELD OF THE INVENTION

The present invention relates generally to a pressure sensitive adhesive (PSA) film of tacky, polymeric microspheres and method of making the same. The PSA film advantageously provides differential peel adhesion properties. In addition, the PSA film advantageously has high shear strength and good tensile properties.

BACKGROUND OF THE INVENTION

In the simplest construction, PSA transfer tapes comprise an unsupported PSA film coated onto a release liner. Transfer tapes are commonly used in a variety of mounting applications, for example, mounting name plates, signs, posters, pictures, bulletin boards, and the like to walls. In these applications, the PSA film is required to provide sufficient shear adhesion to prevent the two bonded substrates from creeping away or separating from each other. For example, when a poster is adhered to a wall, it is desirable that the PSA film provide sufficient shear strength so that the poster does not move or fall off the wall due to the weight of the poster.

At the same time, it is often desirable to be able to detach the bonded substrates from each other without damage to one of the substrates, for example, when one substrate is more valuable or more easily damaged than the other. To facilitate detachment without substrate damage, the opposite major surfaces of the PSA film preferably provide different levels of peel adhesion that are suitable for the particular substrate to which they are attached. For example, the major surface of the PSA film in contact with a poster preferably provides lower peel adhesion than the major surface in contact with a wall to facilitate removal without damaging the poster. Alternatively, when damage to the wall is to be avoided, the major surface of the PSA film in contact with the wall preferably provides lower peel adhesion than the major surface in contact with the poster.

One way to provide different peel adhesion properties is to provide a double-sided tape comprising a core or inner layer having a different adhesive layer on each side. An example of one such double-sided tape is commercially available from 3M as Scotch™ High Tack/Low Tack Double Coated Tape.

While such tapes have proven useful, a need exists for a PSA film having good shear strength and opposite major surfaces which provide different levels of peel adhesion without the need for a core layer and preferably without the need for separate adhesive coatings. Such a construction is simpler than tapes requiring a core layer and separate adhesive coatings, and is therefore easier to produce. In addition, the peel adhesion differential provides removability without substrate damage.

SUMMARY OF THE INVENTION

The present invention provides an unsupported pressure sensitive adhesive (PSA) film. The term "unsupported" means that the film has sufficient structural integrity to hold its shape as a freestanding film without the need for any permanent backing or support. While the film is typically provided on a removable release liner to protect the surface of the film until use, the release liner is not needed to provide structural integrity to the film.

The unsupported PSA film comprises tacky, polymeric microspheres. The microspheres are packed at a density sufficient to provide the unsupported film. In general, this requires substantially all of the microspheres to be adjacent to at least two other microspheres. The microspheres may physically touch other microspheres. Alternatively, the microspheres may be prevented from actually touching each other, for example, by a pressure sensitive adhesive additive that is interspersed between the microsphere. A combination of touching and non-touching microspheres may also be provided in a film.

The unsupported PSA film may be prepared by coating polymeric microspheres onto a release surface. The polymeric microspheres may be hollow or solid or combinations thereof The coating may be aqueous or solvent-based. The coating is allowed to dry on the release surface with one major surface of the coating contacting the release surface and the other major surface of the coating contacting the air. When dried, the coating provides an unsupported PSA film.

Surprisingly, the two opposite major surfaces of the unsupported PSA film provide different peel adhesion properties. More specifically, the major surface in contact with the release surface during drying generally provides higher peel adhesion than the major surface in contact with air. By virtue of this discovery, it is now possible to provide a single PSA film having opposite major surfaces which provide different levels of peel adhesion without the need for separate adhesive coatings or a core layer. Such a film is simpler than constructions requiring separate adhesive coatings and a core layer, and is therefore easier to produce. Such a film also provides removability without substrate damage. Surprisingly, the PSA film also advantageously provides high shear strength and good tensile properties.

The present invention further provides a method of making an unsupported PSA film, the opposite major surfaces of which advantageously provide different levels of peel adhesion. The method comprises the steps of (1) providing polymeric microspheres in water or solvent, (2) coating said microspheres onto a release surface at a density sufficient to provide, upon drying, an unsupported film, and (3) removing the water or solvent, for example, by drying, whereupon the major surface of the coating in contact with the release surface provides one level of peel adhesion while the major surface of the coating in contact with air provides a different level of peel adhesion.

The present invention also provides two substrates adhesively bonded to each other using the unsupported PSA film described above. Still further, the present invention provides a laminate construction comprising the unsupported PSA film described above bearing a layer of pressure sensitive adhesive on at least one major surface thereon.

As used herein, the ensuing terms have the following meanings:
1. "Equivalent weight percent" of a given compound means the number of equivalents of that compound divided by the total number of equivalents in the composition, wherein an equivalent is the total number of grams divided by equivalent weight. The equivalent weight means the molecular weight divided by the number of polymerizable groups in the compound and, in the case of those compounds with only one polymerizable group, the equivalent weight equals the molecular weight.

2. "Hollow" means containing at least one void (i.e., an empty space within completely within the walls of a microsphere) or cavity (i.e., a space within the walls of a droplet or microsphere when still in the suspension or dispersion medium prior to drying, and thus containing whatever medium was used).

3. "Critical micelle concentration" means the minimum concentration of emulsifier necessary for the formation of micelles, i.e., submicroscopic aggregations of emulsifier molecules.

4. "Solid" means not hollow, that is, void-free or cavity-free.

BRIEF DESCRIPTION OF THE DRAWINGS

The present invention may be more readily understood by reference to FIGS. 1–4, wherein.

DETAILED DESCRIPTION OF THE INVENTION

Figure 1:
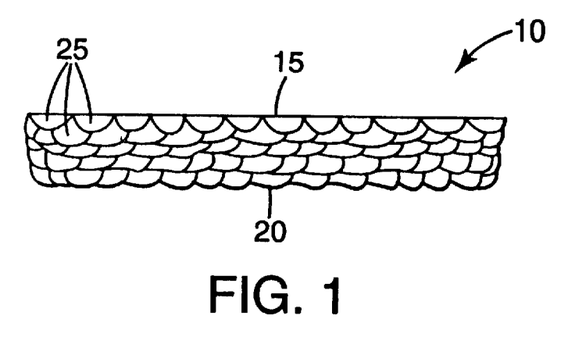
FIG. 1 shows an elevational side view of a film of the present invention.

FIG. 1 provides an elevational side view of a PSA film 10 of the present invention. The film 10 is unsupported, which means that the film 10 has sufficient structural integrity to hold its shape as a freestanding film without the need for any permanent backing or support. While the film 10 is typically provided on a removable release liner to protect the surface of the film until use, the release liner is not needed to provide structural integrity to the film. Preferably, the PSA film has a tensile strength of at least 8 kPa as measured using the test procedure provided in the Examples.

The film 10 comprises tacky, polymeric microspheres 25. The microspheres are packed at a density such that the microspheres form an unsupported film. In general, this requires substantially all the microspheres 25 to be adjacent to at least two other microspheres 25. The microspheres may physically touch other microspheres as illustrated in FIG. 1. Alternatively, the microspheres may be prevented from actually touching each other, for example, by a pressure sensitive adhesive additive that is interspersed between the microsphere. A combination of touching and non-touching microspheres may also be provided in a film. Preferably, the thickness of the film 10 is greater than the average diameter of the microspheres 25 which typically ranges from about 1 to about 250 micrometers. More preferably, the thickness of film 10 is at least three times the average diameter of the microspheres 25.

The unsupported PSA film 10 may be prepared by coating polymeric microspheres onto a release surface. The polymeric microspheres may be hollow or solid. The coating may be aqueous or solvent-based. The coating is allowed to dry on the release surface with one major surface of the coating contacting the release surface and the other major surface of the coating contacting the air. When dried, the coating provides an unsupported PSA film 10 having two major surfaces 15 and 20. Major surface 15 represents the surface that was in contact with the release surface during drying, while major surface 20 represents the surface that was in contact with air.

The topography of major surface 15 is generally smoother than that of major surface 20. As a consequence, major surface 15 generally provides higher peel adhesion than major surface 20. By virtue of this discovery, it is now possible to provide a single PSA film having opposite major surfaces 15 and 20 which provide different levels of peel adhesion without the need for separate adhesive coatings or a core layer. Such a film is simpler than constructions requiring separate adhesive coatings and a core layer, and is therefore easier to produce.

Figure 2:
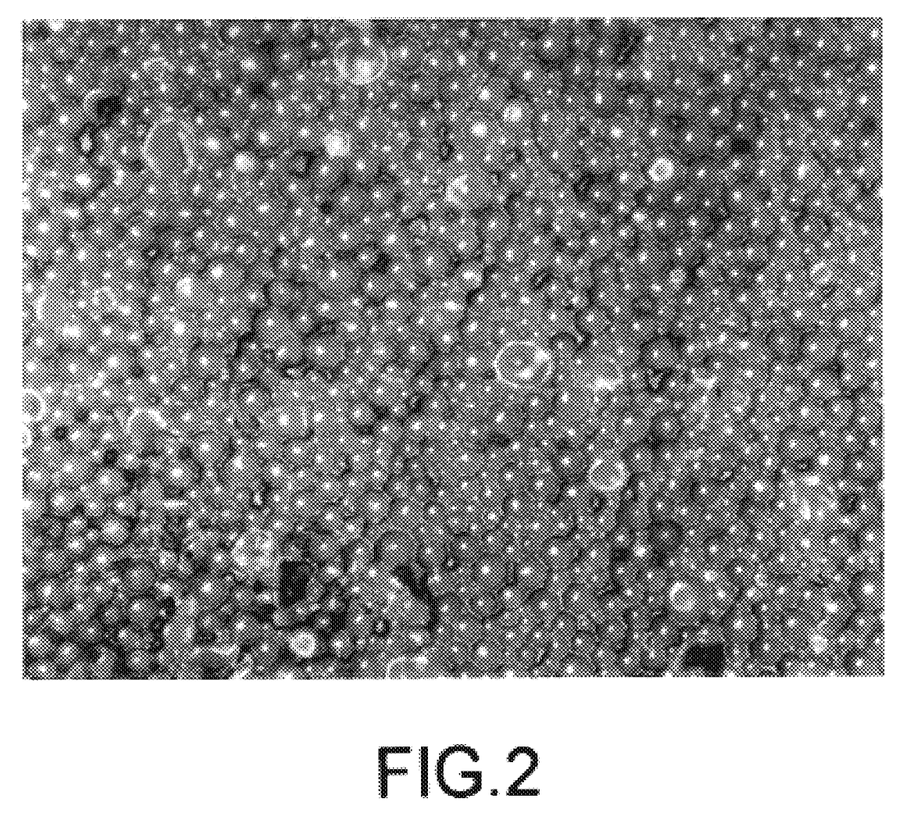
FIGS. 2 and 3 show photomicrographs of opposite major surfaces of a film of the invention.
Figure 3:
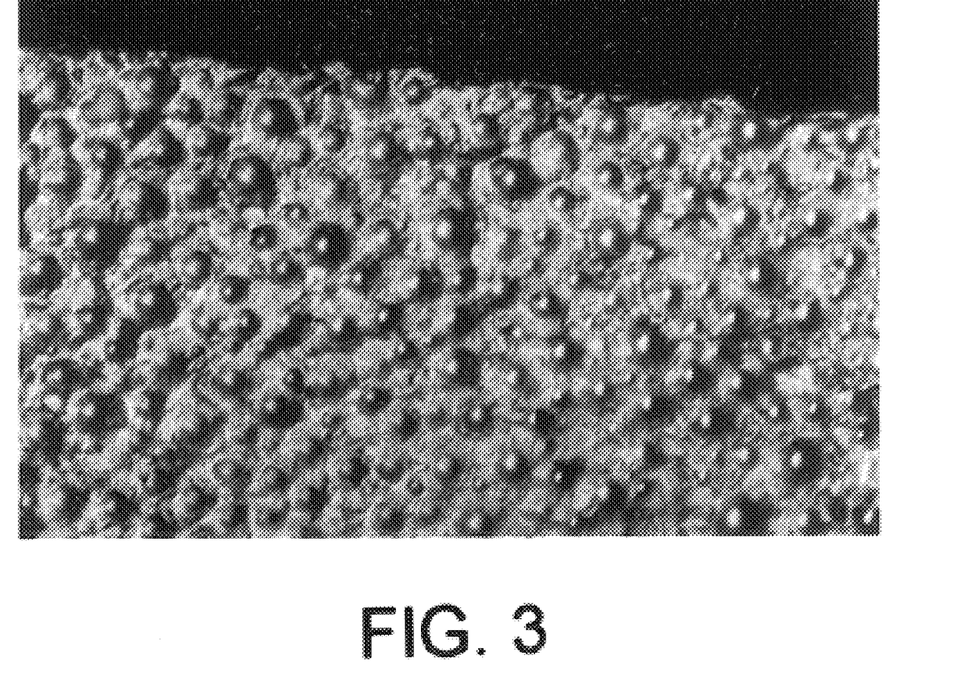

FIGS. 2 and 3 show photomicrographs of opposite major surfaces of a film of the invention. The photomicrographs were obtained using Nomarsid Differential Interference Contrast optics at 100× magnification. The film was prepared as described in Example 5 by coating a water-based suspension of microspheres into a polytetrafluoroethylene mold and allowing the coating to air dry in the mold without a cover. FIG. 2 shows the major surface of a film that was in contact with the mold during drying. FIG. 3 shows the opposite major surface of the same film that was in contact with air during drying. The photomicrographs illustrate that topography of the major surface that was in contact with a release surface during drying (FIG. 2) is smoother than that of the major surface in contact with air (FIG. 3).

The degree to which major surfaces provide different levels of peel adhesion can vary greatly and depends on the particular substrate used to test peel adhesion. In general, smoother test adherends provide greater differences in peel adhesion between the major surfaces. Preferably, the ratio of the peel adhesion of one surface to that of the opposite surface is at least 1.1:1.0 regardless of the test adherend.

The tacky, PSA polymeric microspheres 25 may be hollow or solid or combinations thereof. The microspheres may be acrylate- or vinyl ester-based and prepared by a variety of techniques, including suspension, dispersion, and emulsion techniques, or modifications thereof. Examples of various methods of preparing tacky acrylate microspheres can be found in U.S. Pat. No. 3,691,140 (Silver); U.S. Pat. No. 4,166,152 (Baker et al.); U.S. Pat. No. 4,495,318 (Howard); U.S. Pat. No. 4,786,696 (Bohnel): U.S. Pat. No. 4,988,467 (Delgado); U.S. Pat. No. 5,053,436 (Delgado), U.S. Pat. No. 5,045,569 (Delgado), and PCT Application No. WO 94/13751 (Delgado et al.). Methods of preparing hollow or solid tacky microspheres from vinyl ester monomers can be found in WO 96/01281 (Delgado et al.).

In general terms, aqueous suspensions of polymeric microspheres 25 may be prepared using an emulsification process to form monomer droplets in an aqueous phase, followed by polymerization of the monomer droplets to form microspheres, i.e., microspherical particles of polymer. The emulsion of monomer droplets is typically formed by blending a variety of components in one or more steps. The components typically include monomer(s), stabilizer(s), and water. Other components which may be used include initiators, crosslinking agents, pigments, fillers, stabilizers, tackifiers, plasticizers, and the like. The emulsion is preferably formed by agitating the mixture of components using, for example, mechanical or ultrasonic means.

Preferably, the polymeric microspheres are acrylate-based. U.S. Pat. No. 5,053,436 (Delgado et al) describes "two-step" and "one-step" emulsification processes that are useful in preparing aqueous suspensions of hollow acrylate microspheres. In the first step of the two-step process, a water-in-oil emulsion is formed by combining an aqueous solution of polar monomers with oil phase monomer in the presence of an emulsifier having a low hydrophilic-lipophilic balance (HLB) value. Optional components (e.g., initiator and crosslining agent) may be dissolved in the oil phase prior to formation of the emulsion. A thickening agent, (e.g., methyl cellulose) may be included in the aqueous phase prior to formation of the oil-in-water emulsion. Where it is desirable not to include a polar monomer, water may be mixed directly with the oil phase monomer and emulsifier to from the water-in-oil emulsion. Suitable emulsifiers are those having an HLB value below about 7, preferably in the range of about 2 to about 7. Emulsifiers having an HLB value of greater than about 7 tend to produce an oil-in-water emulsion as opposed to the desired water-in-oil emulsion. Examples of emulsifiers having HLB values less 7 include sorbitan monoleate, sorbitan trioleaste, and ethoxylated oleyl alcohol such as Brij™ 93, available from Atlas Chemical Industries, Inc.

In the second step, a water-in-oil-in-water emulsion is formed by dispersing the water-in-oil emulsion from the first step into an aqueous phase containing an emulsifier having an HLB value above about 6 and any portion of the polar monomers not added in step one. Emulsifiers having an HLB value of less than about 6 tend to produce an oil-in-water emulsion rather than a water-in-oil emulsion. Examples of suitable emulsifiers for the second step include ethoxylated sorbitan monooleate, ethoxylated lauryl alcohol, and alkyl sulfates. In both steps, when an emulsifier is utilized, its concentration should be greater than its critical micelle concentration. Additional details concerning the preparation of multiple emulsions, such as water-in-oil-in-water emulsions, may be found in various literature references, including *Surfactant Systems: Their Chemistry, Pharmacy and Biology* (D. Atwood and A. T. Florence, Chapman & Hall Limited, New York, N.Y., 1983).

In the "one step" emulsification process described in U.S. Pat. No. 5,053,436, at least one alkyl acrylate or alkyl methacrylate ester monomer and at least one moderately ionizable polar monomer are mixed in the presence of at least one emulsifier capable of producing a water-in-oil emulsion inside the droplets which is substantially stable during emulsification and polymerization. As in the two-step emulsification process, the emulsifier is preferably utilized in concentrations greater than its critical micelle concentration. In general, high HLB emulsifiers are required, i.e., emulsifiers having an HLB value of at least about 25, to produce stable cavity-containing droplets during the polymerization. Examples of such emulsifiers include alkylarylether sulfates such as sodium alkylarylether sulfate (e.g., Triton W/30, available from Rohm and Haas) and alkylaylpolyether sulfates such as alkylarylpoly(ethylene oxide) sulfates. Alkyl sulfates, alkyl ether sulfates, and alkylarylether sulfates are preferred as they provide a maximum void volume per microsphere for a minimum amount of surfactant. Polymeric stabilizers may also be present but are not necessary.

Aqueous suspensions of solid acrylate microspheres may be prepared by the method described in U.S. Pat. No. 3,691,140 (Silver). This process comprises aqueous suspension polymerization of at least one alkyl acrylate or alkyl methacrylate ester monomer, at least one emulsifier in a concentration greater than its critical micelle concentration, and at least one polar monomer. Examples of emulsifiers, which are preferably anionic, include: alkylarylether sulfates; alkylarylpolyether sulfates such as ammonium lauryl sulfate, triethanolamine lauryl sulfate and triethanolamine lauryl sulfate and sodium hexadecyl sulfate; alkyl ether sulfates such as ammonium lauryl ether sulfates; and alkylpolyether sulfates such as alkyl poly(ethylene oxide) sulfates.

The polymerization of the monomer droplets is known in the art as aqueous suspension polymerization. During this process, the droplets become microspheres, i.e., microspherical particles of polymer. In the case where hollow microspheres are prepared, aqueous suspension polymerization produces microspheres, the majority of which have at least one interior cavity comprising the emulsion medium. Upon drying, the interior cavity becomes a void.

Heat or radiation may be used to initiate polymerization of the monomers. When heat is used, an initiator is typically included in the emulsion, examples of which include those which are normally suitable for free radical polymerization of acrylate monomers. Preferred initiators include those which are oil-soluble. Examples of such initiators include thermally-activated initiators such as azo compounds, hydroperoxides, peroxides, and the like, and photoinitiators such as benzophenone, benzoin ethyl ether, and 2,2-dimethoxy-2-phenyl acetophenone. The initiator is generally present in an amount ranging from about 0.01 to about 10 weight percent of the total weight of the polymerizable composition.

Alkyl acrylate or methacrylate monomers useful in preparing the acrylate microspheres of this invention are those monofunctional unsaturated acrylate or methacrylate esters of non-tertiary alkyl alcohols, the alkyl groups of which preferably have from about 4 to about 14 carbon atoms. Such acrylates are typically oleophilic, water emulsifiable, have restricted water solubility, and as homopolymers, generally have glass transition temperatures below about −20° C. Included within this class of monomers are, for example, isooctyl acrylate, 4-methyl-2-pentyl acrylate, 2-methylbutyl acrylate, isoamyl acrylate, sec-butyl acrylate, n-butyl acrylate, 2-ethylhexyl acrylate, isodecyl methacrylate, isononyl acrylate, isodecyl acrylate, and the like, singly or in mixtures.

Preferred acrylates include isooctyl acrylate, isononyl acrylate, isoamyl acrylate, isodecyl acrylate, 2-ethylhexyl acrylate, n-butyl acrylate, sec-butyl acrylate, and mixtures thereof. Acrylate or methacrylate or other vinyl monomers which, as homopolymers, have glass transition temperatures higher than about −20° C., e.g., tert-butyl acrylate, isobornyl acrylate, butyl methacrylate, vinyl acetate, and the like, may be utilized in conjunction with one or more of the acrylate or methacrylate monomers provided that the glass transition temperature of the resultant polymer is below about −20° C.

The acrylate is typically provided in an amount sufficient to provide a monomer to water weight ratio of about 1:9 to 1.5:1.0, more preferably 1.0:3.0 to 1.0:1.0.

The emulsion may also contain a polar monomer such as acrylic acid, methacrylic acid, itaconic acid, crotonic acid, maleic acid, fumaric acid, sulfoethyl methacrylate, N-vinyl pyrrolidone, N-vinyl caprolactam, 2-vinyl-4,4-dimethyl-2-oxazolidinone, t-butyl acrylamide, dimethyl amino ethyl acrylamide, N-octyl acrylamide, and ionic monomers such as sodium methacrylate, ammonium acrylate, sodium acrylate, trimethylamine p-vinyl benzimide, 4,4,9-trimethyl4-azonia-7-oxo-8-oxa-dec-9-ene-1-sulphonate, N,N-dimethyl-N-(beta-methacryloxy-ethyl) ammonium propionate betaine, trimethylamine methacrylamide, 1,1-dimethyl-1-(2,3-dihydroxypropyl) amine methacrylamide, mixtures thereof, and the like.

The emulsion may also contain a multifunctional crosslinking agent. The term "multifunctional" as used herein refers to crosslinking agents which possess two or more free radically polymerizable ethylenically unsaturated groups. Useful multifunctional crosslinking agents include acrylic or methacrylic esters of diols (such as butanediol), triols (such as glycerol), and tetraols (such as pentaerythritol). Other crosslinking agents include polyvinylic crosslinking agents (such as substituted and unsubstituted divinylbenzene); and difunctional urethane acrylates The use of a multifunctional crosslinking agent is optional. When used, however, the crosslinking agent is preferably present in an amount that provides less than 0.3 equivalent weight percent of crosslinking agent.

The properties of the microspheres may be altered by addition of tackifying resin and/or plasticizer to the emulsion. Preferred tackifiers include hydrogenated rosin esters commercially available from companies such as Hercules Inc., under such trade names as Foral™, and Pentalyn™. Individual tackifiers include Foral™ 65, Foral™ 85, and Foral™ 105. Other useful tackifiers include those based on t-butyl styrene. Useful plasticizers include dioctyl phthalate, 2-ethyl hexyl phosphate, tricresyl phosphate, and the like.

Following polymerization, an aqueous suspension of microspheres is obtained which is stable to agglomeration or coagulation under room temperature conditions. The microspheres of the invention are typically elastomeric. The term "elastomeric" has been described, for example, as ". . . applying to amorphous or non-crystalline materials that can be stretched to at least twice their original length and which will retract rapidly and forcibly to substantially their original dimensions upon release of the force." [S. L. Rosen, *Fundamental Principles of Polymeric Materials*, Wiley (New York, 1982) page 314]. The microspheres of the invention are also typically solvent swellable, that is, they swell in a solvent causing the dimensions of the microspheres to increase. The microspheres are also typically solvent-dispersible, that is, capable of forming a dispersion consisting substantially of individual particles in solvent. The microspheres are small, typically having diameters of at least 1 micrometer, preferably in the range of about 1 to about 250 micrometers. The microsphere suspension may have non-volatile solids contents of from about 10 to about 50 percent by weight. Upon prolonged standing, the suspension separates into two phases, one phase being aqueous and substantially free of polymer, the other phase being an aqueous suspension of microspheres. Both phases may contain a minor portion of small latex particles. If desired, the aqueous suspension of microspheres may be utilized immediately following polymerization.

Alternatively, the aqueous suspension may be coagulated with polar organic solvents such as methanol, with ionic emulsifiers having a charge opposite to that of the emulsifier used in the polymerization process, or with saturated salt solutions, or the like, followed by washing and drying. The dried microspheres, with sufficient agitation, will readily disperse in common organic liquids such as ethyl acetate, tetrahydrofuran, heptane, 2-butanone, benzene, cyclohexane, and esters.

While the foregoing discussion has focused on acrylate-based microspheres, vinyl ester-based microspheres are also within the scope of the invention. Methods for preparing vinyl ester-based microspheres can be found in WO 96/01281. Useful vinyl ester monomers include those having the general formula:

wherein $R^1$ is selected from the group consisting of linear or branched alkyl groups having 1 to 12 carbon atoms. Such vinyl ester monomers include, but are not limited to, vinyl 2-ethylhexanoate, vinyl caprate, vinyl laurate, vinyl pelargonate, vinyl hexanoate, vinyl propionate, vinyl decanoate, vinyl octanoate, and other vinyl esters of linear or branched carboxylic acids. Cyloaliphatic- and phenylalkyl-substiuted vinyl esters may also be used.

The film 10 of the invention may be prepared by coating aqueous or solvent dispersions of polymeric microspheres 25 onto a release surface. Examples of suitable release surfaces include paper, coated paper and plastic film substrates which inherently possess adhesive-releasing characteristics and, more commonly, substrates which have been treated with silicone, fluoropolymer, fluorosilicone, or other release coatings. Preferred release materials are silicone coatings comprising polysiloxanes. Such release materials are described, for example, in *Paper, Film & Foil Converter*, 62:57–59 (1988) and the *Journal of the Adhesive and Sealant Council*, 18:11–25 (1989).

The dispersions may be coated using conventional coating techniques such as knife coating or Meyer bar coating or use of an extrusion die. The dispersions of polymeric microspheres are coated at a density such that an unsupported film is formed upon removal of the water or solvent carrier. Preferably, the microspheres are coated at a density sufficient to provide a film having a thickness greater than the average diameter of the microspheres. More preferably, the film thickness is at least three times the average diameter of the microspheres.

Drying is typically accomplished by exposing the microspheres to temperatures sufficient to drive off the carrier liquid, but lower than the decomposition temperature of the microspheres. Typical drying temperatures are in the range of about 60° C. to about 100° C. with exposure times of about 1 to 10 minutes. The interfacial bonding between microspheres can be enhanced by further crosslinking using known techniques.

The film 10 of the invention may optionally comprise a PSA additive blended with the microspheres. Examples of such PSA additives include tackified natural rubbers, tackified block copolymers (e.g., styrene-isoprene-styrene, styrene-butadiene-styrene, and styrene-ethylene-butene-styrene block copolymers), tackified silicone elastomers, and inherently tacky materials such as poly(acrylates), poly(vinyl esters), and poly(alpha-olefins). Preferably, such a PSA additive is present at levels less than 20 percent by weight based on the total weight of the film, more preferably, less than 9 percent by weight. Most preferably, no such PSA additive is used. It is noted that when a PSA additive is used, the PSA additive typically resides between the closely packed microspheres.

The PSA film 10 of the present invention may also comprise one layer of a laminate construction. For example, the PSA film may bear one or more additional layers of a film-forming PSA on at least one major surface thereof Suitable film-forming PSAs for such a laminate construction include those that exhibit pressure sensitive adhesive properties either inherently or by compounding with commonly known tackifying resins. Examples of such PSA compositions include tackified natural rubbers, tackified block copolymers (e.g., styrene-isoprene-styrene, styrene-butadiene-styrene, and styrene-ethylene-butene-styrene block copolymers), tackified silicone elastomers, and inherently tacky materials such as poly(acrylates), poly(vinyl esters), and poly(alpha-olefins).

The film 10 of the present invention is typically provided on a release liner and further wound into a roll for storage convenience. When the film is to be used in a mounting application, a portion of the film 10 is unwound and cut from the roll. One major surface of the film 10 is applied to a first substrate (for example, a poster), and the release liner is removed. The poster is then typically applied with pressure to a second substrate (for example, a wall) so that the newly exposed surface of the film contacts the wall, and a bond is formed. The PSA film of the invention may be used in a variety of mounting applications, for example, mounting name plates, signs, posters, pictures, bulletin boards and the like to walls.

Figure 4:
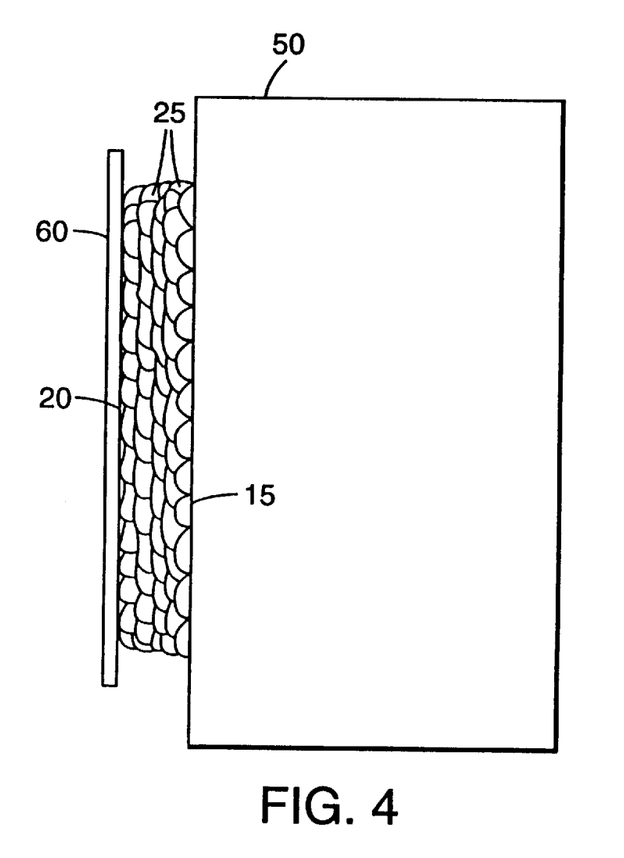
FIG. 4 shows a side view of a film of the present invention used to bond two substrates together.

FIG. 4 shows a side view of two substrates 50 and 60 bonded together using the film 10 of the present invention. Major surface 15 of film 10 is in contact with substrate 50, while major surface 20 of film 10 is in contact with substrate 60. As described previously, major surface 15 provides higher peel adhesion than major surface 20. This configuration is especially useful when substrate 60 is more easily damaged or more valuable than substrate 50, and it is desirable to detach substrates 50 and 60 from each other without damaging substrate 60. Because major surface 20 provides lower peel adhesion than major surface 15, substrate 60 may be removed without damage thereto. Of course, when substrate 50 is more valuable or more easily damaged than substrate 60, the reverse configuration may be advantageously employed to facilitate detachment of the bonded substrates without damage to substrate 50. Thus, by virtue of its differential peel adhesion properties, the film 10 of the present invention advantageously provides removability without substrate damage.

These and other aspects of the invention are illustrated by the following examples which should not be viewed as limiting in scope.

EXAMPLES

I. Abbreviations and Tradenames

AmA=Ammonium acrylate

BDA=Butanediol diacrylate

IOA=Isooctyl acrylate

AA=Acrylic acid

HDDA=1,6-hexanediol diacrylate

Standapol™ A=ammonium lauryl sulfate available from Henkel, Inc. (Germany)

Lucidol™ 70=benzoyl peroxide available from Atochem North America, Inc.

Siponic-Y-500-70=poly(oxyethylene)oleyl ether available from Rhone-Poulenc, Inc. (Cranberry, N.J.)

Irgacure 651=alpha, alpha-dimethoxy-alpha-phenyl acetophenone available from Ciba-Geigy (Hawthorne, N.Y.)

Room Temperature=20–25° C.

Teflon=polytetrafluoroethylene

II. Test Procedures

A. Peel Adhesion

Peel adhesion is the force required to remove a coated flexible sheet material from a test panel measured at a specific angle and rate of removal. In the examples, this force is expressed in Newtons per decimeter (N/dm) width of coated sheet. The procedure followed is:

A strip 1.27 cm in width of the coated sheet is applied to the horizontal surface of a test panel with at least 12.7 lineal cm in firm contact. A 2 kg hard rubber roller is used to apply the strip. The free end of the coated strip is doubled back nearly touching itself so the angle of removal will be 180°. The free end is attached to the adhesion tester scale. The test panel is clamped in the jaws of a tensile testing machine which is capable of moving the plate away from the scale at a constant rate. A constant rate of 30.5 cm/min is used with paper test panels while a constant rate of 228.6 cm/min is used with glass test panels. The scale reading in N/dm is recorded as the tape is peeled from the test panel surface. The data is reported as the average of the range of numbers observed during the test.

B. Shear Strength

The shear strength is a measure of the cohesiveness or internal strength of an adhesive. It is based upon the amount of force required to pull an adhesive strip from a standard flat surface in a direction parallel to the surface to which it has been affixed with a definite pressure. It is measured in minutes required to pull a standard area of adhesive coated sheet material from a stainless steel test panel under stress of a constant, standard load.

The tests were conducted on strips of coated sheet material applied to a stainless steel panel such that a 1.27 cm by 1.27 cm portion of each strip was in firm contact with the panel with one end portion of the tape being free. The panel with the coated strip attached was held in a rack such that the panel formed an angle of 178° with the extended tape free end which was tensioned by application of a force of 500 gram applied as a hanging weight from the free end of the coated strip. The 2° less than 180° is used to negate any peel forces, thus insuring that only the shear forces are measured, in an attempt to more accurately determine the holding power of the tape being tested. The time elapsed for each coated film to separate from the test panel was recorded as the shear strength.

C. Tensile Strength

Tensile strength is a measure of the cohesive strength of the microsphere films. It is based on the amount of force required to strain a microsphere film to the breaking point at a given rate of strain (elongation). The test used was ASTM-D-412-83 (option: method B) "Rubber Properties in Tension", with the following modifications: a film of microspheres was cut into a ring having an inside circumference of 5.08 cm, a 1 mm radial width and a nominal thickness of 1 mm. The rings were placed in a testing rig that caused the rings to rotate while strain was applied. Rotation equalized the strain that the sample experiences during the test.

Example 1

Hollow microspheres were prepared as follows:

In a one-liter resin reactor equipped with mechanical stirrer, condenser, and inlet-outlet lines for vacuum and argon, 450 grams of deionized water, 144 grams of IOA, 6 grams of AA and 0.71 grams Lucidol™ 70 were charged. Vacuum was applied to evacuate the reactor atmosphere, and the reactor was then purged with argon. The agitation was set to 400 rpm and when the initiator had dissolved, 6.0 grams of Standapol™ A were added. The temperature of the reactor was raised to 60° C. and maintained during the polymerization. After a 22-hour period, the suspension was allowed to cool to room temperature. The reactor was emptied and the suspension filtered. Optical microscopy revealed hollow microspheres having diameters of from about 4 to 90 micrometers suspended in water. The majority of the microspheres contained a central having a cavity diameter of at least 30% of the diameter of the microspheres.

An acetone dispersion of microspheres was then prepared as follows:

The aqueous suspension was allowed to separate into two phases, a microsphere-rich phase and a water phase. The microsphere-rich phase was decanted to provide a concentrated aqueous suspension of microspheres. This concentrated aqueous suspension of microspheres was added to acetone. The acetone phase was removed and new acetone was added. This procedure continued until less than about 1 percent by weight water remained. Additional acetone was added to provide an acetone dispersion having a 35 wt % solids content.

Transfer tapes were then prepared by coating the acetone dispersion of the hollow microspheres (35 wt % solids) onto a release liner. The coatings were dried at room temperature to provide unsupported films. Photomicrographs of each surface of the resulting film indicated that one surface was smoother than the other. More specifically, the side of the film which was in contact with the release liner during drying yielded a smooth surface, while the side in contact with air during drying appeared to be bumpy.

PSA samples were prepared by laminating the adhesive films to a polyethylene backing so that either the smooth or bumpy side of the film was exposed. The samples were conditioned overnight in the constant temperature-humidity room (21° C. and 50% RH) and the peel adhesion to standard copy paper (having a smooth and rough side) and glass were tested using the procedure described above. The average thickness of the adhesive films was 125 microns. Table I shows peel adhesion results for the two different sides of the film using a paper adherend. Table II shows peel adhesion results for the two different sides of the film using a glass adherend. All peels were smooth without delamination of the paper despite the relatively high peel adhesions. Also, no adhesive transfer was observed from any of the samples.

TABLE I

Peel Adhesion to Paper

| Tape Side | Peel Adhesion Rough Side of Paper (N/dm) | Peel Adhesion Smooth Side of Paper (N/dm)) |
| --- | --- | --- |
| Smooth | 36.3 | 40.9 |
| Bumpy | 31.5 | 36.1 |

TABLE II

Peel Adhesion to Glass

| Tape Side | Peel Adhesion to Glass (N/dm) |
| --- | --- |
| Smooth | 45.5 |
| Bumpy | 30.6 |

As can be seen in the tables, the adhesion of the smooth side is greater than the adhesion of the bumpy side, regardless of the adherend. Also, the smoother the adherend, the higher the overall adhesion performance and the greater the difference between the two sides.

Shear performance of the samples was tested on stainless steel panels using the procedure described above. Either side of the samples (bumpy or smooth) gave over 10,000 minutes shear with no failure.

Example 2

This example illustrates the preparation of a two-layer laminate PSA construction comprising a PSA film of acrylate polymer microspheres laminated to a film prepared from a solventborne acrylate PSA.

A solventborne acrylate PSA having a solids content of 22–27 wt % in ethyl acetate/heptane, an inherent viscosity of 1.5–1.75 dl/g and a viscosity of 5,000–10,000 cps was prepared according the method of U.S. Pat. No. Re 24,906 (Ulrich) using 93 parts IOA, 7 parts AA, and 0.2 parts VAZO 64 initiator (N,N'-azobis(isobutyronitrile) available from DuPont). A dispersion of hollow microspheres having a solids content of 33 wt % in isopropyl alcohol was prepared according to the method of Example 1 using 141 grams IOA and 9 grams AA. The microspheres had an average diameter of 41 microns. The solventborne acrylate PSA was knife coated onto a release liner at a thickness of 125 microns and the coated release liner was placed in a drying oven set at 65° C. for 10 minutes. The coated release liner was then replaced on the knife coater and coated with a 500 micron thick film of the hollow microsphere dispersion. The microsphere-coated laminate was placed in a drying oven set at 65° C. for 20 minutes. The final dried weight ratio of solventborne acrylate PSA to acrylate polymer microspheres was 1:3. The laminate sample was conditioned overnight in a constant temperature room at 21° C. and 50% relative humidity and removed from the release liner. PSA samples were prepared by attaching the laminate to a primed polyester backing so that either the smooth (solventborne PSA) or bumpy (microsphere) side of the laminate was exposed. The peel adhesion and shear strength of both of the adhesive surfaces were tested as described above. The results of these tests are found in Table III.

TABLE III

Laminate Construction

| Example | Tape Side | Thickness (microns) | Peel Adhesion to Glass (N/dm) | Peel Adhesion to Paper[1] (N/dm) | Shear (min) |
| --- | --- | --- | --- | --- | --- |
| 3 | Bumpy | 200 | 21.9 | 5.0 | 192 |
| 3 | Smooth | 200 | 99.4 | 88.9 | 584 |

[1]No distinction was made between the sides of the paper.

This example demonstrates that the PSA film of the invention may be used in a laminate construction to provide a large differential in adhesive properties between the two sides of the laminate construction.

Example 3

A two-layer laminate PSA construction was prepared according to the method of Example 2 with the following variations. A 45.7 weight percent solids emulsion acrylate PSA was prepared according to Example 41 of U.S. Pat. No. 4,737,577 (Brown et al.) using 95 parts by weight IOA and 5 parts by weight AA. The hollow microsphere dispersion of Example 2 was knife coated onto a release liner at a thickness of 500 microns, and the coated release liner was placed in a drying oven set at 65° C. for 20 minutes. Once dried, the microsphere-coated release liner was replaced on the knife coater and coated with a 125 micron thick film of the emulsion acrylate PSA. The laminate was placed in a drying oven set at 65° C. for 10 minutes. The final dried weight ratio of emulsion acrylate PSA to acrylate polymer microspheres was 1:3. The laminate sample was conditioned overnight in a constant temperature room at 21° C. and 50% relative humidity and removed from the release liner. PSA samples were prepared by attaching the laminate to a primed polyester backing so that either the smooth (emulsion acrylate PSA) or bumpy (microsphere) side of the laminate was exposed. The peel adhesion and shear strength of both of the adhesive surfaces were tested as described above. The results of these tests are found in Table IV.

TABLE IV

Laminate Construction

| Example | Tape Side | Thickness (microns) | Peel Adhesion to Glass (N/dm) | Peel Adhesion to Paper[1] (N/dm) | Shear (min) |
|---|---|---|---|---|---|
| 4 | Bumpy | 200 | 43.8 | 54.3 | 1401 |
| 4 | Smooth | 200 | 81.9 | 63.3 | 1505 |

[1]No distinction was made between the sides of the paper

This example also illustrates that the PSA film of the invention may be used in a laminate construction.

Example 4

This example illustrates the preparation of a PSA film comprising acrylate polymeric microspheres and a PSA additive. The hollow acrylate PSA dispersions and solvent-borne PSA (both of Example 2) were blended at a dry weight ratio of 90:10 and knife coated on a release layer at a thickness of 500 microns. The coated liner was placed in a drying oven set at 65° C. for 15 minutes. The blended sample was conditioned overnight in a constant temperature room at 21° C. and 50% relative humidity and removed from the release liner. PSA samples were prepared by attaching the laminate to a primed polyester backing so that either the smooth (liner) or bumpy (exposed) side of the laminate was exposed. The peel adhesion and shear strength of both of the adhesive surfaces were tested as described above. The results of these tests are found in Table V.

TABLE V

Microsphere/PSA Additive

| Example | Tape Side | Thickness (microns) | Peel Adhesion to Glass (N/dm) | Peel Adhesion to Paper[1] (N/dm) | Shear (min) |
|---|---|---|---|---|---|
| 5 | Bumpy | 100 | 32.2 | 11.6 | 6957 |
| 5 | Smooth | 100 | 52.5 | 57.1 | 6082 |

[1]No distinction was made between the sides of the paper

This example illustrates that a blend of microspheres with a PSA additive may be used to prepare the film of the invention.

Example 5

IOA/AmA microspheres were prepared as follows:

A 2-liter resin flask equipped with a mechanical stirrer was charged with 900 ml of deionized water and 6.0 grams of AA. The mixture was stirred and neutralized to a pH of 7.0 with concentrated ammonium hydroxide. 293.85 grams of IOA and 1.42 grams of Lucidol™ 70 were added, and the contents of the flask was purged with argon three times. 12.0 grams of Standapol™ A were then added, followed by additional purging of the contents of the flask. The contents of the flask was then heated to 60° C. with stirring for 20 hours using a mechanical stirrer setting of 400 rpm. The resulting suspension was cooled to room temperature and filtered through cheesecloth to remove any coagulum that had formed. The particle size was determined to be 35 microns using a Microtrac Particle Size Analyzer.

A suspension of the solid microspheres in water (50 weight percent solids content) was poured into a Teflon™ mold, 15 mm deep by 100 mm in diameter, and allowed to dry in the air for several days. A sample of the approx. 7 mm thick film was removed and examined under a microscope. Photomicrographs of both sides (one exposed to air, the other exposed to the Teflon mold) were made using Nomarsid Differential Interference Contrast optics at 100× magnification. The photomicrograph (FIG. 2) of the side exposed to Teflon showed a smooth, uniform layer of microspheres with little or no shadowing. Conversely, the photomicrograph (FIG. 3) of the side exposed to air showed a fairly regular pattern of protuberant microspheres, indicative of a high degree of surface roughness.

Example 6

An aqueous dispersion of solid microspheres (identified below as S-MS) was prepared as follows:

In a 3-liter Mortonized resin reactor equipped with mechanical stirrer, condenser and outlet/inlet lines for vacuum and argon, 1500 ml deionized water and 5.0 grams of a 30/70 w/w % copolymer of AA/dimethylaminoethyl methacrylate, viscosity 7000 cps, were charged. Concentrated ammonium hydroxide was added until a pH of 7 was reached. 500 grams of IOA and 75 grams of Lucidol™ 70 were then added and a vacuum was applied to evacuate the reactor atmosphere, and the reactor was then purged with argon. Siponic Y-500-70 was then added, the stirrer speed set to 500 rpm, and the reaction mixture was heated to 60° C. overnight. After heating, the reactor was cooled to room temperature and emptied. The reactor contents were filtered through cheesecloth to obtain a suspension of microspheres in water. Microsphere particle size was determined by a Microtrac Particle Size Analyzer and found to be about 32–33 microns.

An aqueous dispersion of hollow microspheres having an average diameter of 40 microns (identified below as H-MS) was also prepared using the procedure described in Example 1.

Two thin microsphere films (1.3 mm thick) were prepared by casting aqueous dispersions of microspheres in Teflon™ clad molds and then drying at room temperature for 7 days, followed by heating at 55–60° C. for 24 hours. The films were dusted with talc and ring samples prepared by die cutting. The rings were conditioned at 21° C. and 50% RH for 3 days prior to testing. The tensile strength of the two different microsphere films was determined using the procedure described above using three different separation rates (12.7 cm/min, 50.8 cm/min, and 127 cm/min). The results are reported below in Table VI.

TABLE VI

Tensile Strength

| Sample | Separation Rate | Elong % | Tensile Max kPa (kpsi) |
|---|---|---|---|
| S-MS | 12.7 cm/min | 1419 | 82.7 (0.012) |
| H-MS | 12.7 cm/min | 762 | 765.3 (0.111) |
| S-MS | 50.8 cm/min | 1769 | 151.7 (0.022) |
| H-MS | 50.8 cm/min | 903 | 1400 (0.203) |
| S-MS | 127 cm/min | 2091 | 255.1 (0.037) |
| H-MS | 127 cm/min | 837 | 1041 (0.151) |

These results show that the films of the invention have good extensibility and high cohesive strength.

Comparative Example C1

A bulk polymerized acrylate adhesive was prepared and tested for tensile strength for comparison with samples of the present invention. One would expect the tensile properties of the bulk polymerized acrylate adhesive to greatly exceed those of the films of the invention.

A partially polymerized acrylic PSA composition was prepared by dissolving 0.04 weight percent Irgacure 651 photoinitiator into a mixture comprising 90 weight percent IOA and 10 weight percent AA and irradiating the mixture with low intensity UV light until about 10% polymerization was achieved. The partially polymerized composition was mixed with 0.0275 grams HDDA and 0.1125 grams Irgacure 651. This mixture was degassed by sparging with argon and poured into a mold. The mold was covered with a siliconized polyester liner and irradiated with UV light for 15 minutes at room temperature. The sample obtained was 1.6 mm thick. This film was dusted with talc and cut into rings and tested for tensile strength as described in Example 6.

TABLE VII

| Sample | Separation Rate | Elong % | Tensile Max kPa kPa (kpsi) |
|---|---|---|---|
| C1 | 50.8 cm/min | 1300 | 1965 (0.285) |
| C1 | 127 cm/min | 1220 | 2357 (0.342) |

Surprisingly, the tensile properties of the films of the present invention (especially those comprising hollow microspheres H-MS) approach those of the bulk polymerized adhesive C1.

We claim:

1. An unsupported film of pressure sensitive adhesive, said film comprising tacky polymeric microspheres packed at a density sufficient to form a freestanding film without the need for any backing or support and said film having a thickness that is greater than the average diameter of said microspheres.

2. An unsupported film of pressure sensitive adhesive according to claim 1, wherein said film essentially does not contain a pressure sensitive adhesive additive blended with said microspheres.

3. An unsupported film of pressure sensitive adhesive according to claim 1, said film additionally comprising a pressure sensitive adhesive additive blended with said microspheres at a level of about 10 percent by weight or less based on the total weight of the film.

4. An unsupported film of pressure sensitive adhesive according to claim 1 wherein said microspheres have a diameter in the range of from about 1 micron to about 250 microns.

5. An unsupported film of pressure sensitive adhesive according to claim 1 having a thickness that is at least three times the average diameter of said microspheres.

6. An unsupported film of pressure sensitive adhesive according to claim 1 wherein said microspheres are acrylate-based.

7. An unsupported film of pressure sensitive adhesive according to claim 1 wherein said microspheres are vinyl ester-based.

8. An unsupported film of pressure sensitive adhesive according to claim 1 wherein said microspheres comprise a polar monomer.

9. An unsupported film of pressure sensitive adhesive according to claim 1 wherein said microspheres comprise a photoinitiator.

10. An unsupported film of pressure sensitive adhesive according to claim 1 wherein said microspheres comprise a multifunctional crosslinking agent.

11. An unsupported film of pressure sensitive adhesive according to claim 1 wherein said film is releasably attached to a release liner.

12. An unsupported film of pressure sensitive adhesive according to claim 1 wherein said film comprises a blend of hollow and solid microspheres.

13. The unsupported film of pressure sensitive adhesive of claim 11 wound into a roll.

14. Two substrates adhesively attached to each other using the film of claim 1.

15. An unsupported film of pressure sensitive adhesive according to claim 1, said film additionally comprising a pressure sensitive adhesive additive blended with said microspheres.

16. An unsupported film of pressure sensitive adhesive according to claim 15 wherein said pressure sensitive adhesive additive is present at a level less than about 20 percent by weight based on the total weight of the film.

17. A laminate construction comprising the film of claim 1 bearing a layer of pressure sensitive adhesive on at least one major surface thereof.

18. An unsupported film of pressure sensitive adhesive according to claim 1 wherein said film comprises first and second opposite major surfaces, said first major surface having a different level of peel adhesion than said second major surface.

19. An unsupported film of pressure sensitive adhesive according to claim 1 wherein said microspheres are hollow.

20. An unsupported film of pressure sensitive adhesive according to claim 1 wherein said microspheres are solid.

21. A method of making the unsupported pressure sensitive adhesive film according to claim 1, said method comprising the steps of:

(1) providing polymeric microspheres in water or solvent;

(2) coating said microspheres onto a release surface at a density sufficient to provide, upon drying, an unsupported film; and (3) allowing the coating to dry on said release surface, one surface of the coating in contact with the release liner and the other surface in contact with air.

22. An unsupported film of pressure sensitive adhesive according to claim 1 wherein said film has tensile strength of at least about 80 kPa.

23. An unsupported film of pressure sensitive adhesive, said film comprising tacky polymeric microspheres packed at a density sufficient to form a freestanding film without the need for any backing or support and said film having a tensile strength of at least about 80 kPa.

24. An unsupported film of pressure sensitive adhesive according to claim 23 wherein said microspheres are hollow.

25. An unsupported film of pressure sensitive adhesive according to claim 23 wherein said microspheres are acrylate-based.

26. An unsupported film of pressure sensitive adhesive according to claim 23 wherein said microspheres comprise a polar monomer.

27. An unsupported film of pressure sensitive adhesive according to claim 23, said film additionally comprising a pressure sensitive additive blended with said microspheres.

28. A laminate construction comprising the film of claim 23 bearing a layer of pressure sensitive adhesive on at least one major surface thereof.

29. An unsupported film of pressure sensitive adhesive according to claim 23 wherein said film comprises first and second opposite major surfaces, said first major surface having a different level of peel adhesion than said second major surface.

* * * * *